United States Patent [19]

Bosisio

[11] 3,829,764

[45] Aug. 13, 1974

[54] METHOD AND APPARATUS FOR MEASURING PHYSICAL AND/OR CHEMICAL PROPERTIES OF MATERIALS

[76] Inventor: Renato Guiseppe Bosisio, 745 Louis Herbert, Longueuil, Quebec, Canada

[22] Filed: Apr. 3, 1973

[21] Appl. No.: 347,418

[30] Foreign Application Priority Data
Apr. 5, 1972  Great Britain.................... 15597/72

[52] U.S. Cl............................................ 324/58 R
[51] Int. Cl............................................ G01r 27/04
[58] Field of Search.. 324/58 R, 58 B, 58 C, 58.5 B, 324/58.5 C

[56] References Cited
UNITED STATES PATENTS
3,162,807  12/1964  Alford .............................. 324/58 B
3,586,971  6/1971  Bosisio .......................... 324/58.5 C
3,717,811  2/1973  Wheeler ........................... 324/58 B

OTHER PUBLICATIONS
Bosisio et al., Automatic Field Measurements in Microwave Applicators, Journal of Microwave Power, 4/1969, pp. 152–156.

*Primary Examiner*—Stanley T. Krawczewicz
*Attorney, Agent, or Firm*—Robert J. Schaap

[57] ABSTRACT

A method and apparatus for measuring physical and/or chemical properties of materials such as dielectric constants, solid content, or the like without establishing any physical contact with the materal. The method and the apparatus rely upon the generation of electromagnetic waves, presumably radio frequency waves in a fringing field which is directed toward the surface of the material to be tested. The electromagnetic waves are coupled through this material and a sensor in an oscillator circuit and this oscillator circuit generates an oscillating frequency proportional to the property of the material.

28 Claims, 26 Drawing Figures

METHOD AND APPARATUS FOR MEASURING PHYSICAL AND/OR CHEMICAL PROPERTIES OF MATERIALS

This invention relates in one aspect to a method, and in another aspect to an apparatus which in one embodiment, may be used for measuring the properties of materials such as the dielectric constants, moisture content or other liquid or solid content, thickness, density and the like, with or without establishing physical contact between the material and the apparatus.

In brief summary of one embodiment of the present invention, at least one fringing field radio frequency oscillator, and preferably a far field radio frequency oscillator, is provided and is directed towards the surface of the material to be tested. The oscillator includes a sensor to control the frequency of oscillation, which may be determined by known relationships which, in turn, depend on the RF fields linking the sensor to the material to be tested for determining a property such as those indicated above. A direct frequency measurement of the resulting signal generated from the oscillator(s) provides the desired material property measurement. The measurement of the fringing field oscillator frequency, as measured by a converter or other suitable numeric measuring means or instruments, may provide a direct digital output of high accuracy and stability which may be used in conjunction with digital computers and in process control systems.

In greater detail of the present invention, the method and apparatus in one embodiment may be used for sensing a constituent or component of a material or substrate (such as liquid or solid content), configuration, thickness of a material or substrate (such as of a metal plate, plastic film, etc.) without coming into direct contact with the material being tested.

An important embodiment of the present invention relates to the application of the method aand apparatus of this invention for the measurement of the moisture content, or for that matter other liquid content, by non contact means, at the wet end of a paper-manufacturing system where the sheet material is very fragile and any contact between the material and a sensor could damage the material being formed and interrupt the machine operation.

Another important embodiment of the present invention relates to the measurement of the basis weight of a paper sheet, by indirect means, at the end of the Fourdrinier section of a paper machine. At this point in the paper making process the paper sheet is very fragile, and the method and apparatus of this invention are most suitable for making dielectric profile measurements under these conditions.

Such profile measurements can correspond to basic weight profiles when the moisture content is proportional to the fibre content in the virgin sheet. The above dielectric profile is also suitable for obtaining a profile of the "water line" formation on the Fourdrinier machine itself: A prolongation or a recess of the water line on the Fourdrinier partially determines the water content that is left in the virgin sheet at that point in the cross machine direction.

An apparatus suitable for carrying out this embodiment, and others according to the invention, can also be used to measure the moisture content of the dry end of paper or similar material in a system where the accuracy of the absolute measurement of moisture is more critical than avoiding a physical contact. Heretofore, microwave moisture measurements have been performed either by microwave energy absorption techniques (such as, e.g., shown in U.S. Pat. No. 3,079,551) or by resonant frequency techniques (such as is shown in U.S. Pat. Nos. 2,458,808 and 3,586,971). The prior art, however, suffers from a number of limitations: for example, the microwave absorption method is not reliable in practical use due to the varying microwave absorption constant, due to the various chemical additives which are employed in the paper-making process. On the other hand, the resonant technique is limited in accuracy by the lack of sharpness in the general shape of the measurement curve peak amplitude which is involved in determining the resonance factor. The various resonant techniques also require that electrical wires or RF cables be attached to the sensor head to establish an electrical link between the point of measurement and the electronic recording means. The length of these distances can be in the order of 30 to 100 feet so that the length of the cable is physically important in the use of the instrument on paper machines where access is very often restricted.

In the apparatus of the present invention, there is utilized a new far field sensor which permits large distances between the material to be tested and the sensor measuring surface. This unique feature of the far field sensor permits non contact measurements, and at the same time, it removes or vastly diminishes the inaccuracy of measurements due to varying material basis weight and thickness. Traditionally, the sensor configurations of the above-referred to patents are limiting in that they are flat-surfaces dictated by the fact that the resonant RF fields are planar. Any attempt to make the measuring surface circular or curved in a plane perpendicular to the plane of the substrate or material to be tested would result in a loss of sensitivity due to the increased average distance between the substrate or material and the position of the sensor surface defined by the maximum field intensity in the resonators pertaining to the above invention. In this respect, it has also been found that the far field sensor, as described hereinafter, is particularly suitable for use with a fringing field radio frequency oscillator. This sensor possesses a circular RF fringing field geometry in one embodiment, and it is thus suitable for use wherever circular sensor surfaces are required. The advantages of curved sensors are related to aerodynamic flow features which are often desirable in the vicinity of fast-moving materials (such as paper sheets which can move up to 5,000 feet per minute); moreover; the curved surface facilitates the slippage of the material past the sensor wherever it is in direct contact with the material under measurement — e.g. at the dry end of a paper machine or a wet felt. Flat or planar sensor surfaces are likely to cause paper breakage when brought into contact with the paper sheet of a paper machine. In addition the circular geometry of the sensor makes it suitable for use inside circular surfaces such as the walls of a bore hole made in the earth for geological exploration.

In addition, the far field sensor has far-reaching fields in the space adjacent to the sensor surface configuration or geometry which enables its use in indirect contact type measurements for both dielectric and metal sheets, or other like materials, as will be evident from the examples hereinafter.

The method of this invention is applicable to any radio frequency fringing field device, and is not limited to radio frequency fringing field resonant devices. Indeed, the basic requirement of the sensor used in the fringing field oscillator is that it be approximately an integral number of one-half wavelengths in length, when its fringing fields are linked to the material or substrate under measurement or testing, such that a micorwave amplifier connected to the sensor, so as to form a closed loop, is set into oscillation when the phase change between the input and the output terminals of the amplifier are exactly equal to an integral (including zero) number of wavelengths and the closed loop gain is greater than unity. Thus, any open transmission line with fringing fields that link into an adjacent material may be used as a sensor according to the teachings of this invention, (e.g. a rectangular waveguide with slots in the broad wall or the narrow wall can generate fringing fields with or without dielectric plugs situated inside the slots). Also, any open slow wave structure may be utilized as a sensor in the fringing field oscillator pertaining to this invention, (e.g. a helix or an interdigital line can be used as an open slow wave structure).

Unlike the teachings in the above-mentioned U.S. patents the slow wave structure need not be resonant for its use in the fringing field oscillator.

As outlined previously, the fringing field radio frequency oscillator technique, relating to this invention, is also suitable for measurement of the thickness of substrates or materials such as metal sheets, etc. The advantages of the method and apparatus of this invention, over the resonant perturbation technique as taught in the prior art, e.g., U.S. Pat. No. 3,514,703, are similarly related to the advantages of this invention over the previously mentioned resonant techniques for measuring moisture content — namely: accuracy, maneuverability, non contact (as opposed to the teachings of th latter U.S. patent where the sensor creates RF fields which extend over a distance of about 6 mm from the sensor surface). This clearance is insufficient when the running metal sheets have a displacement due to flutter greater than the extent of the resonator RF field, namely 6 mm. For the field sensor, of this invention, the extent of the RF field is in the order of 3 inches or more. Additionally, with this invention, the ease of providing digital output data from a direct frequency measurement and the fact that there need not be any physical link between the point of measurement and the point of recording the measured data, provides further advantages.

An important advantage of the present invention is that the apparatus and method also permits the sensing of a component or constituent of solids, liquids or gaseous material by means of the radio frequency signals emitted in general from fringing field oscillators and in particular, from a far fringing field radio frequency oscillator using a far field sensing device. Also, with the present invention, there is provided a system and method for determining the moisture or other liquid content, which is relatively insensitive to the thickness of the material, and on the other hand, which is capable of determining the density of the material.

The method and apparatus of the present invention as used in a testing capacity for determining various measurements, such as across a moving web of material, by the use of mechanical means, such as a mechanical arm fitted with a fringing field radio frequency oscillator, and in particular a far fringing field radio frequency oscillator, in combination with a radiating antenna, is also provided.

Furthermore, the present invention also provides a novel method and apparatus for measuring the moisture profile, or dielectric film thickness, across a moving web by the use of a number of fringing field radio frequency oscillators, and in particular, the far fringing field radio frequency oscillator feeding a multi-channel (one for each oscillator) frequency counter in a transmission line or radiating antenna.

Still further, with the present invention, there is also provided a highly stable and accurate apparatus for determining the moisture content, or other liquid content, or of the thickness of film, e.g. plastic films, or other material constituents, in digital form, suitable for feeding a computer controlled process in direct frequency measurement on radiated or cable-transmitted signals.

In accordance with an additional feature of the present invention, there is provided a method for measuring the configuration or thickness of substrates, such as a metal body having a high temperature or a metal body such as an iron plate or the like moving at high speed, continuously, and with high precision while not touching the material being measured or tested.

Moreover, with this invention, there is provided a method and apparatus of measuring the configuration or thickness of metal bodies, having high temperaature, as for example an iron plate moving at high speeds by using one or more fringing field radio frequency oscillators in one of various manners.

Still further, with this invention, there is provided a method and apparatus for measuring the moisture content of margarine, butter, cheese and other such materials as they are pumped through a short section of plastic tubing or pipe in the course of the manufacturing process.

As another aspect of the invention, there is provided a method and apparatus for measuring the grade and the aspect ratio of an egg by means of a non-contact sensor as described in this invention.

As a further aspect of the invention, there is provided a method and apparatus for measuring the moisture content in pharmaceutical products, such as pills, by a preferred non-contact sensor as described in this invention.

As a salient feature of the invention, there is provided a method and an apparatus for measuring the material contents along the walls of a hole drilled into the earth. Such holes are often used for obtaining information on mineral and organic contents useful in the location of new earth resources (e.g. water, oil, minerals, etc.).

As an additional salient feature, there is provided a method and apparatus for reducing the effects of temperature variations on the stability of the frequency generated by the fringing field radio frequency oscillator.

Still further there is provided a method and apparatus for measuring the dielectric profile of a virgin sheet coming off the Fourdrinier section of a paper machine. Such a profile can be related to the basis weight profile and/or the water-line profile on the Fourdrinier machine.

Having thus generally described the invention reference will be made to the accompanying drawings illustrating preferred embodiments and in which.

The present invention contemplates, in one part, the measurement of the moisture content, or other material constituents or components, of the thickness of a dielectric film with high precision without necessarily making contact with the material under measurement.

Figure 1:
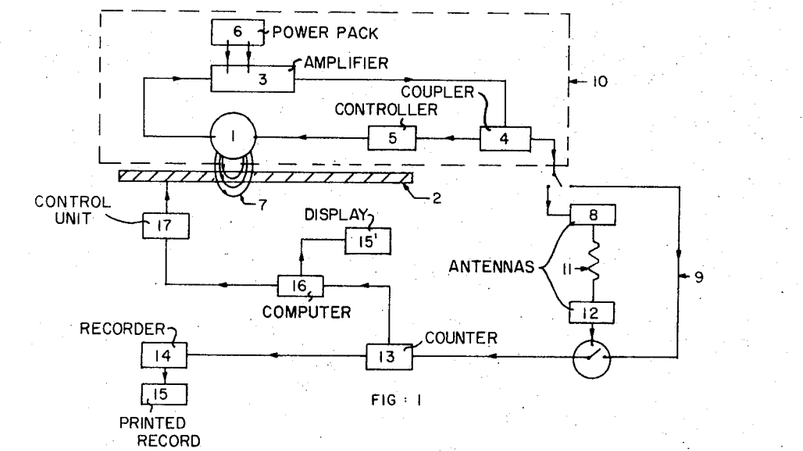
FIG. 1 is a block diagram of a typical system for measuring the frequency signal generated from a fringing field radio frequency oscillator directed at a material or substrate surface.

In FIG. 1, there is illustrated a typical measuring arrangement employed in the present invention. Reference numeral 1 designates a far field or other fringing field sensor which is directed towards the material to be tested, the latter being indicated by numeral 2. A standard rectangular or co-axial transmission line with slotted conductors such as to produce a fringing field in the space adjacent to the transmission line may be used. Also, a standard slow wave structure such as a helix or interdigital line may be used. The output port of a radio frequency amplifier 3 is connected to the input port of the far field sensor 1 in series with a directional coupler 4 (or other type of power divider) and phase controller 5 as shown. The output of the sensor 1 is connected to the input port of the amplifier 3, which is activated with a suitable D.C. voltage (e.g. 12 volts) from a power pack 6. The amplifier 3 need not be of a very high power so that the power pack 6 may be portable if desired. For a suitable amplifier gain and phase adjustment, a fringing RF field 7 will be generated in the vicinity of the sensor head 1 such that the medium to be measured determines, in part, the frequency of oscillation brought out by the amplifier 3. The oscillation frequency therefore varies as the constituents of the material 2 under measurement or testing varies. The output of the directional coupler 4 can be fed to a transmitter antenna 8 or directly connected to a transmission line 9. The frequency signal from the fringing field oscillator 10 is in one case radiated as indicated by reference numeral 11 to the receiving antenna 12 and then fed to a frequency counter 13. In the case where the oscillation signal frequency is transmitted by a cable 9, the frequency counter 13 is fed directly from the output of the directional coupler 4.

A BCD (binary coded decimal) output from the frequency counter 13 feeds a digital recorder 14 which provides a printed record 15 of the oscillation frequency and therefore of the material component or constituent under measurement. The output signal from the frequency counter 13 can also supply the information on the oscillation frequency to a process control computer 16 which commands a process control unit 17. The computer can also be programmed to provide a separate, and more elaborate, print-out or display 15' than the digital recorder print-out 15.

In accordance with the present invention, it can be observed that any form of radio frequency field oscillator apparatus could be employed, as for example, a resonant fringing field radio frequency structure. In like manner, a propagating fringing field structure could be employed, and in the preferred aspect of the present invention a far fringing field structure is utilized. The input of the amplifier is preferably powered by the power pack 6, although other forms of power sources could be employed as indicated previously.

It can be observed that an electrically closed loop is formed with the amplifier 3, the coupler 4 and the sensor 1 in which the frequency field generated at the sensor 1 is linked through the material under measurement in such a manner that a coherent signal is generated when a DC voltage is applied to the amplifier 3. A portion of this generated signal is then transmitted to the frequency counter 13 which is generally located at a suitable distance from the point of measurement. In like manner, it should be observed that any suitable frequency measurement equipment could also be utilized in accordance with the present invention.

In accordance with the present invention it is possible to use radio frequency energy of as low as 50 megahertz, although the minimum preferred range is about 100 megahertz. The normal operating range is about 250 megahertz, although in many cases the apparatus may be operated at frequencies in the range of 400 to 450 megahertz. However, it is also possible to operate at a range as high as 10,000 megahertz. In this particular case therefore the term radio frequency will therefore be limited to the range of 50 to 10,000 megahertz. While it is recognized that the frequencies as high as 10,000 megahertz may be considered to be microwave energy, the energy is treated as radio frequency energy since the important criterion is that the energy must be in a time varying field, and further the energy is coupled through an external medium, such as a material to be tested. However, it should be understood that at the higher frequencies, typical microwave energy transmission means could be employed.

Figure 2:
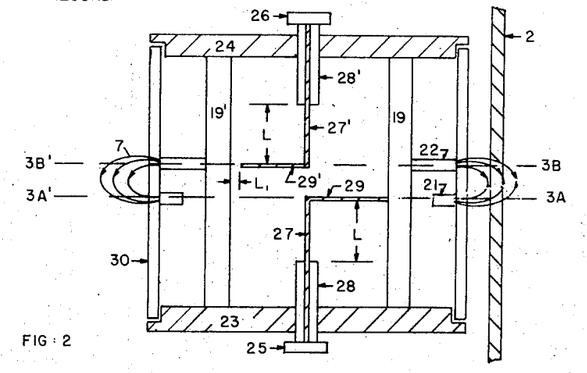
FIG. 2 is a vertical cross-section of a far fringing field sensor directed at the material or substrate surface under measurement or testing.
Figure 3A:
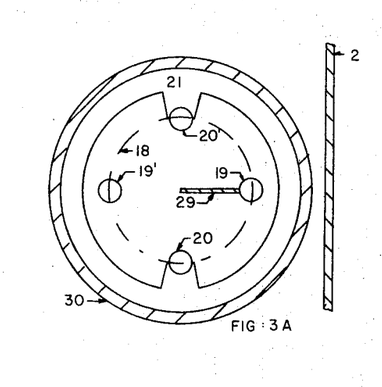
FIGS. 3A and 3B are horizontal sections on the lines 3A—3A' and 3B—3B' of FIG. 2.
Figure 3B:
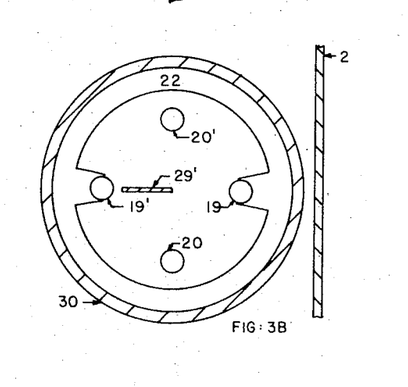

Referring now to FIGS. 2, 3A and 3B, various sections of far fringing field sensor means, consisting of two pairs of parallel conducting rods 19, 19', 20 and 20' are shown and are equally spaced on a circle 18 and maintained together by means of conducting rings 21 and 22 near their midplane. The two pairs of conductors are terminated at each end by shorting planes 23 and 24 traversed by input 25 and output 26 couplers whose center conductors 27 and 27' are extended to a distance L from the termination of the outer conductors 28 and 28'. In order to suitably excite the far field sensor, it is necessary to connect one center conductor of either the input 25 or output 26 coupler to the vertical conducting rod 19 via a transverse wire 29. The center conductor 27' of the remaining coupler 26 is then coupled to the rod 19' situated opposite the vertical rod 19 which was previously directly connected to the inner conductor 27. The capacitive coupling abovementioned with operative association with the rod 19', is obtained by having a small gap $L_1$ between the extension wire 29' of the conducting vertical rod 19' which it faces. A suitable low loss dielectric (e.g. teflon or alumina) cylinder 30 encapsulates the assembly so as to prevent any accumulation of foreign particles within the structure and to provide the sensor structure with suitable protection during usage.

The conducting rods 19, 19', 20 and 20' need not be parallel or for that matter equally spaced for the sensor to work. The conducting rods can be disaligned by as much as 45° and their spacing may be non-uniform by as much as 40 percent before the sensor will significantly loose its operating performance as described in this invention. In the case when only two conducting rods are used the annular rings 21 and 22 are not necessary. The rings may also be replaced by conducting wires or other electrically connecting means without seriously limiting the operation of the sensor. The conducting rods 19, 19' may protrude through the end shorting planes 23 and 24 without affecting, in any way, the operation of the sensor. Other means of exciting the sensor may be used; e.g. a magnetic coupling may be used instead of the capacitive type coupling shown in FIGS. 2, 3A and 3B. Furthermore the couplers need not be introduced through the end shorting planes 23, 24 as illustrated in the above figures. One or both couplers 25, 26 may be introduced from a radial direction and need not make physical contact with the shorting planes, 23, 24, the conducting rods 19, 19' or the annular rings 21, 22. The effect of not using the annular rings is to diffuse the electric field lines between the two shorting planes 23 and 24. The use of only one annular ring concentrates the formation of the electric field lines in an area adjacent to the annular ring, and the use of two or more annular rings concentrates the electric field lines mainly in a region between and adjacent to the rings.

It can also be said that the outer conductors 28 and 28' of the coaxial transmission lines used for introducing the couplers 25 and 26 into the sensor need not come into contact with the shorting planes 23 and 24 as shown in FIG. 2. Indeed it was found that a flexible coaxial transmission line stripped of its outer conductor over a distance less than half a wavelength could be suitable for exciting the sensor. Still further, the end shorting planes need not be parallel but may be disaligned by as much as 30° before seriously affecting the operation of the sensor. The surface area occupied by the end shorting planes may be extended beyond the surface area enclosed by the conducting rods without in any way affecting the operation of the sensor.

The distance which exists between the annular rings 21 and 22 can be as large as ⅓ and 1/100 of half a wavelength at the operating frequency of operation of the microwave amplifier 3. In a preferred aspect of the present invention, the distance between the annular rings 21 and 22 is between about 1/6 and 1/50 of half a wavelength at this operating frequency and in yet even a more preferred range of spacing, the distance between the annular rings 21 and 22 is preferably about 1/12 to about 1/25 of a half wavelength. The axial position of the annular rings 21 and 22 is not actually critical in accordance with the present invention. One or more of these annular rings may actually deviate from a center plane formed by the two end shorting conductors 23 and 24 by as much as 30 percent of the average distance between these conductors 23 and 24.

In general, the pairs of alternate vertical conductors 19 and 19', and 20 and 20', are contacted by the annular rings 21 and 22 just above and below their midpoints respectively, and the annular rings effectively surround the respective vertically disposed conductors. The separation between the two annular conductive rings is preferably kept small in comparison with the overall length of the vertical extending rods 19 and 19' and 20 and 20' as indicated previously. In this way, the space which exists between the annular rings is effectively permeated with an electric field so as to serve as a probing region for the sensor itself.

Figure 4:
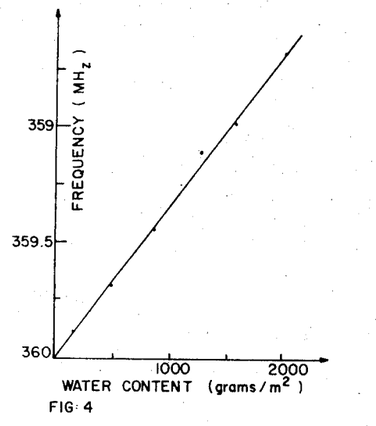
FIG. 4 is a diagrammatic view which illustrates the frequency variation of the far fringing field oscillator as a function of the water or moisture content of a web material expressed in grams per square meter.

The results of an experiment are illustrated in FIG. 4 where a dielectric web was impregnated with varying amounts of water, expressed in grams per square meter, and then the far fringing field oscillator frequency was measured according to the method taught in this invention.

Figure 5:
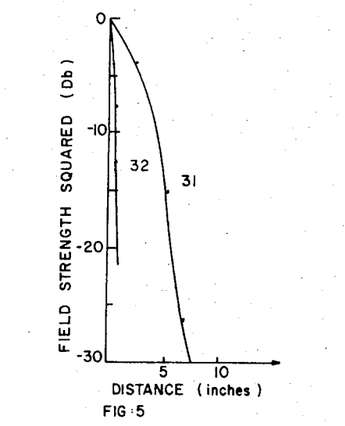
FIG. 5 is a diagrammatic view which shows the squared value of the field strength of the far fringing field oscillator as a function of the distance from the sensor surface.

FIG. 5 shows the difference in the reach or length of the far fringing field sensor curve 31, and the reach or length of prior art fringing field sensors shown by curve 32. The RF field squared from the far field sensor has decreased by 10 Db at a distance of 3½ inches and by 20 Db at a distance of 5½ inches. On the other hand, the prior art sensor has reached out only one-half inch before its RF field strength squared has decreased by 20 Db. This indicates that the far field sensor is indeed superior to prior art sensors for making a non-contact type measurement.

Figure 6:
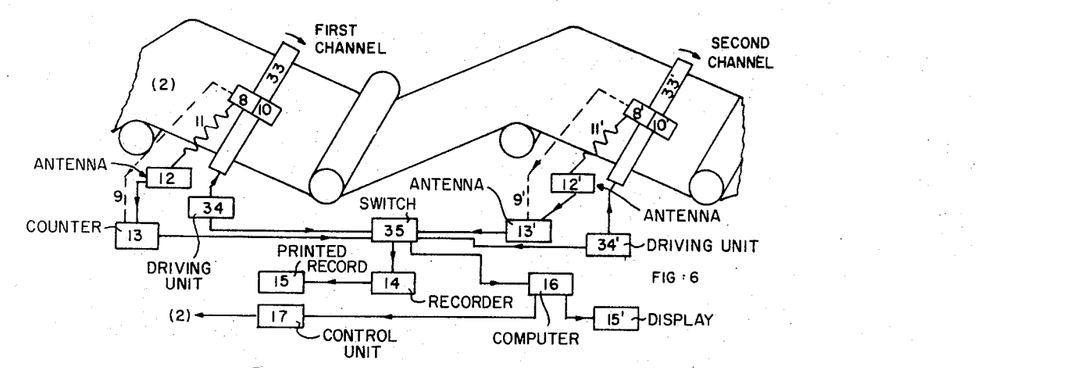
FIG. 6 is a schematic illustration of a system with a moving transverse arm or the like for measuring the moisture profile or the thickness of a dielectric film, of a moving web.

FIG. 6 illustrates a system which employs a movable fringing field oscillator 10 mounted on a shaft 33 extending across the sheet from a driving unit 34 which mechanically permits scanning by the sensor 1 across the sheet material 2. The circuit used to generate the oscillation frequency is the same as that illustrated in FIG. 1 and includes for example, the amplifier 3, the coupler 4, the phase controller 5, and the sensor 1. A power source 6 would also be employed.

A transmitting antenna 8 and a receiving antenna 12 enables the frequency signal generated from the fringing field osciallator 10 to be radiated, as shown at 11, across the width of the sheet 2 without requiring a physical link such as, for example, a cable 9. The frequency counter 13 measures the input signal frequency from the receiving antenna 12 or cable 9. A second shaft 33' operable by a driving unit 34' is also employed. Again the generator frequency signal could be transmitted from antenna 12' to 13' or directly coupled by the wire 9'. A multi-channel selector switch 35 enables the frequency count from either of these two channels or for that matter from a number of channels, to be recorded on a print-out or display 15 is a desired sequence via a multi-channel digital recorder 14. Alternatively, the frequency information from each channel can be fed to a computer 16 which commands a process control unit 17 and displays or prints, as shown at 15', the desired information on the cross machine direction (for example, the moisture profile, or dielectric sheet thickness).

As a specific example the first channel can be mounted at the end of the Fourdrinier section in a paper making machine where the virgin sheet is very fragile and it must therefore be free of any physical contact with the sensor. The second channel shown in FIG. 6 could be situated at the end of the felt press sections where the paper sheet is still fragile and subject to breakage if contacted by a sensor surface. The process control unit, in this case, would be pressure control valves (not shown) in the press sections which adjust the pressure, from a computer 16 instruction, across the width of the felts according to the moisture profile measured at the first channel. The moisture profile from the second channel provides the computer unit 16 with sufficient information to decide if instructions given to the pressure control valves were effective in providing a uniform moisture profile at the output of the press sections. If the moisture profile is not uniform, more or less pressure can be applied, to the various pressure valves, in the press section, according to the moisture profile information received from the first and second channel readings.

Furthermore in the cases where the dielectric profile from the first channel (at the end of the Fourdrinier) can be related to the basis weight profile, the computer unit 16 can command the paper machine head-box feed adjustments such as to make the basis weight profile more uniform across the sheet width.

Figure 7:
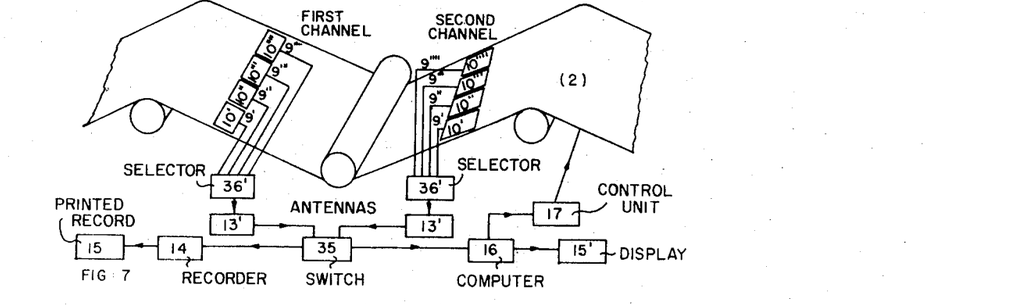
FIG. 7 is a schematic illustration of a system with a stationary transverse member, consisting of a plurality of fringing field oscillators, for measuring the moisture profile of a moving web or the dielectric film thickness.

FIG. 7 illustrates a system wherein the material under study is a paper sheet 2 and wherein a plurality of fringing field oscillators 10', 10'', 10''', etc. are spaced from the sheet material in the direction of the width of the sheet for the first channel. The fringing field oscillators 10', 10'', 10''', etc. are connected to a sensor selector unit 36' and a frequency counter 13' measures the frequency of the fringing field oscillators 10', 10'', 10''', etc. in a sequence determined by the sensor selector unit 36'. The sequence of frequency measurements etc. are then sequentially recorded on a print-out or display 15 on one channel or one line via the multi-channel recorder 14. The choice of the particular recording channel is made by the multi-channel selector 35 according to a predetermined program. In this way a record of the frequency measurements for each channel corresponds to the moisture profile of the paper sheet along the first channel. The output of the multi-channel selector 35 may also be fed to a computer 16 which may command a process control unit 17 and provide its own display or print-out on the display 15' of the moisture profile of any one channel or, if desired, the moisture profile difference between any two channels.

Figure 8:
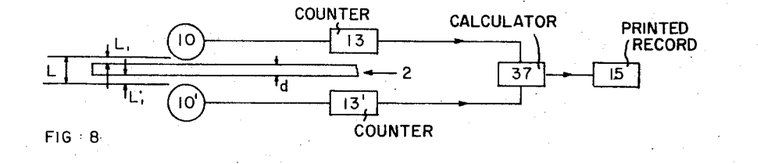
FIG. 8 is a block diagram of a typical system for measuring two frequency signals generated from the fringing field oscillators directed at opposite sides of a metal sheet.

FIG. 8 shows an exemplary method of measuring the thickness of a metal plate by the use of two fringing field oscillators. The output frequency from the fringing field oscillator 10 is dependent on the distance $L_1$. The frequency is measured by the frequency counter 13. A second frequency from the fringing field oscillator 10' is measured by counter 13' and the total length $L_1$ plus $L_1'$ is found with a calculator 37 which provides a display or record of $L - L_1' - L_1$. This length is equal to the metal thickness d since L is constant.

Figure 9:
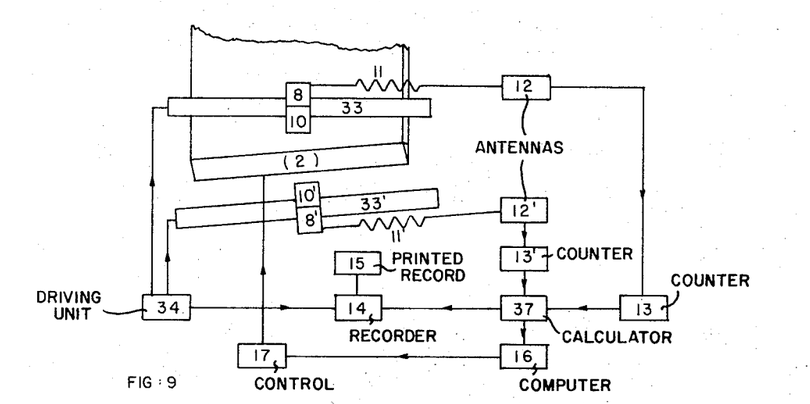
FIG. 9 is a schematic illustration of a system with a double traversing axle system and each axle thereof supporting a fringing field oscillator on opposite sides of a metal sheet, for measuring the thickness profile of a moving metal sheet.

The profile of a metal sheet thickness may also be obtained by mounting two fringing field oscillators 10, 10', one on each of two moving transverse shafts 33, 33', situated on opposite sides of the moving sheet 2 as shown in FIG. 9. The respective output frequencies are measured by frequency counters 13, 13' and the metal thickness d is calculated continuously by the calculator 37 as the fringing field oscillators 10, 10' traverse the width of the metal sheet 2. The thickness results from the calculator 37 are shown on a display or print-out 15 via a digital recorder 14 as a function of the sensor position supplied by the drive unit 34. Alternately, the thickness information from the calculator 37 can be fed into a computer 16 which controls the sheet processing via the process control unit 17.

The thickness of plastic or dielectric films may also be measured according to the methods and apparatus described in FIGS. 1, 2, 3, 4, 6 and 7. In this particular embodiment of the invention it is merely necessary to calibrate the frequency of the fringing field oscillator in terms of the film thickness rather than water content as was done in FIG. 4.

Figure 10:
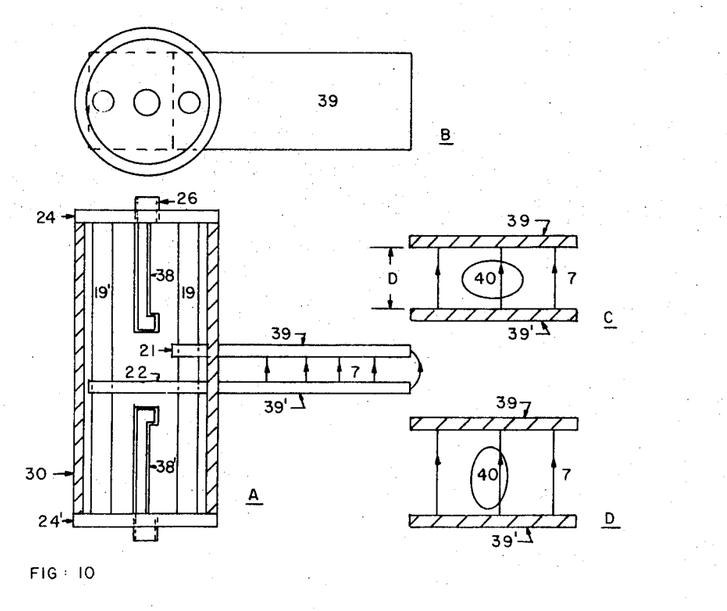
FIGS. 10A and 10B are respectively a side view and a top view of a preferred embodiment of the fringing field sensor of FIG. 2 useful in measuring, by non-contact means, the egg aspect ratio and to grade each egg into one of four classes: small, medium, large, extra large.
FIGS. 10C and 10D are cross-sectional views of the sensor plates forming part of the apparatus of FIGS. 10A and 10B and into which an egg has been placed with its major axis perpendicular and parallel to the electric field lines.

FIGS. 10A, 10B, 10C and 10D refer to various sections of a preferred embodiment of the fringing field sensor coupled via loops 38 and 38', in which two metallic plates 39 and 39' are extended outside the protective shell 30 such as to provide an electric field 7 in between the two plates. The distance D between the plates is such that an egg 40 can easily be inserted. The orientation of the major axis of the egg can either be parallel or perpendicular to the electric field 7 direction as shown in FIGS. 10C and 10D.

Figure 11:
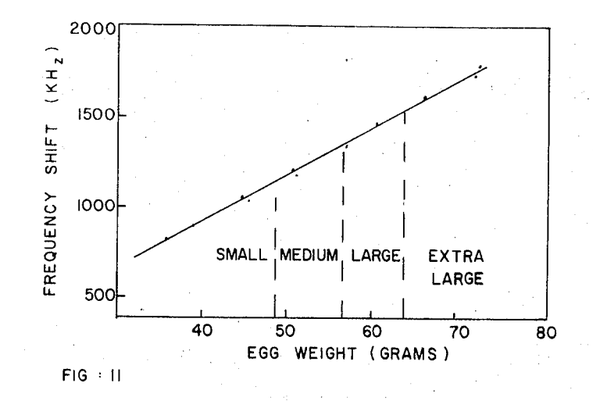
FIG. 11 is a diagrammatic view which shows the fringing field oscillator frequency shift as a function of egg weight when the electric field lines are perpendicular to the egg's major axis.

The results of another particular experiment involving egg weight are more fully illustrated in FIG. 11. The frequency shift of a fringing field oscillator is therein plotted as a function of the egg weight. It is seen that the four commercial grades of eggs, namely small, medium, large and extra large, can be identified from the frequency shift measurements. This equipment therefore enables one to sort eggs by means of a non-contact measurement thereby diminishing the risk of egg damage.

Figure 12:
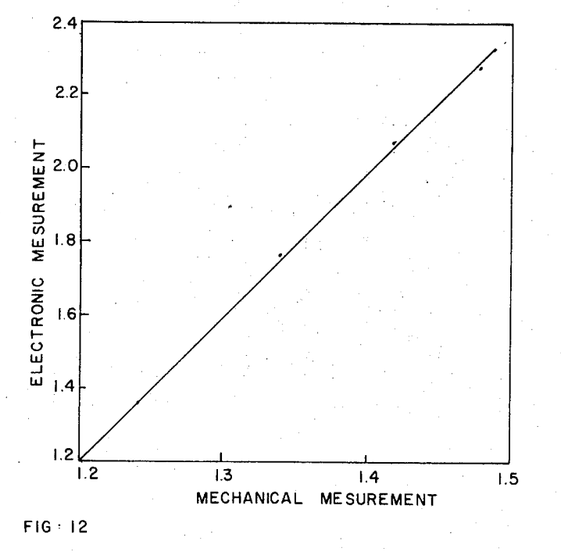
FIG. 12 is a diagrammatic view showing a calibration chart of the electronic measurement which is the frequency shift $f_2$ (egg's axis parallel to the electric field lines) divided by the frequency shift $f_1$ (egg's axis perpendicular to the electric field lines) as a function of the mechanical measurement of the egg's aspect ratio (length divided by width)

The results of a similar experiment are also more fully illustrated in FIG. 12. In this case the apparatus is used to measure the egg aspect ratio. This is also done without any physical contact between the sensor and the egg. The egg aspect ratio is defined as the ratio of the length to the width of an egg, i.e. the ratio of the major elliptic axis to that of the major axis. This measurement can be obtained by reading the frequency shift $f_1$ of the oscillator when the major axis of the egg 40 is parallel to the electric field lines 7 and dividing it by the frequency shift $f_2$ taken when the major axis of the egg is perpendicular to the electric field lines 7. The results are shown in FIG. 12 as aforesaid, where the egg aspect ratio, measured according to this invention, is shown as a function of the mechanical measurement.

Figure 13:
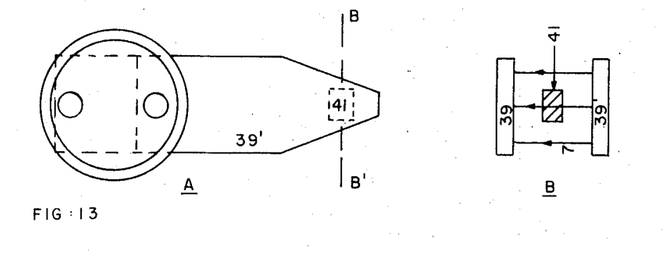
FIG. 13A is a top view of the sensor of FIG. 10 in which the parallel plates thereof are shown in a preferred embodiment for measuring, by non-contact means, small dielectric objects such as pills, tablets, etc.
FIG. 13B is a cross-sectional view along line B—B' of FIG. 13A.
Figure 14:
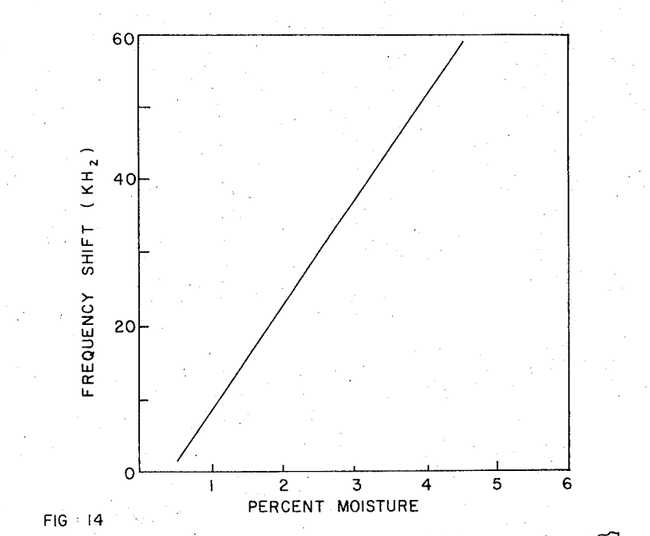
FIG. 14 shows the fringing field oscillator frequency shift as a function of the moisture content in an aspirin tablet.

FIGS. 13A and 13B show another preferred embodiment of the far field sensor used to measure the moisture content in pharmaceutical products such as drugs and pills. In this case the parallel plates 39 and 39' are altered to concentrate the electric field 7 in the volume occupied by the pill 41. Results of moisture measurements in aspirin tablets are illustrated in FIG. 14.

Figure 15:
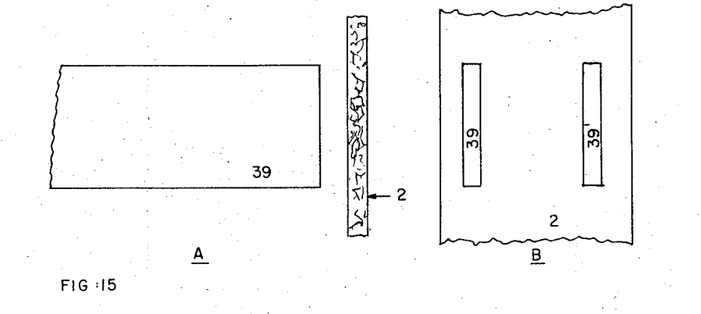
FIGS. 15A and 15B are respectively a front view and a side view of the sensor in FIG. 10A when used for measuring moisture content in dielectric webs.
Figure 16:
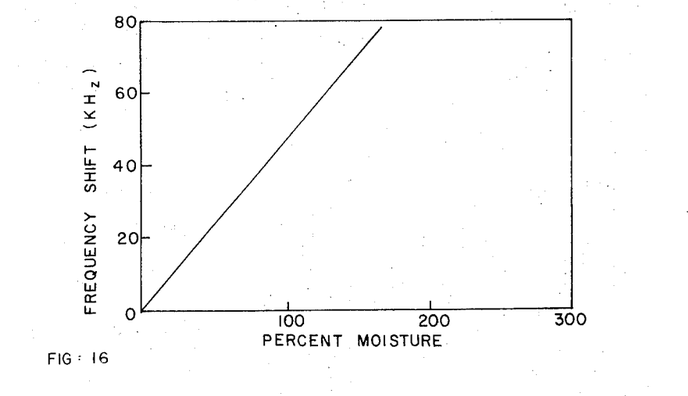
FIG. 16 is a diagrammatic view which shows the measured frequency shift as a function of the moisture content in a paper sheet.

FIGS. 15A and 15B show the sensor plates 39 and 39' positioned such as to measure the moisture content in a web or a paper sheet. FIG. 16 illustrates the results obtained on a paper sheet.

Figure 17:
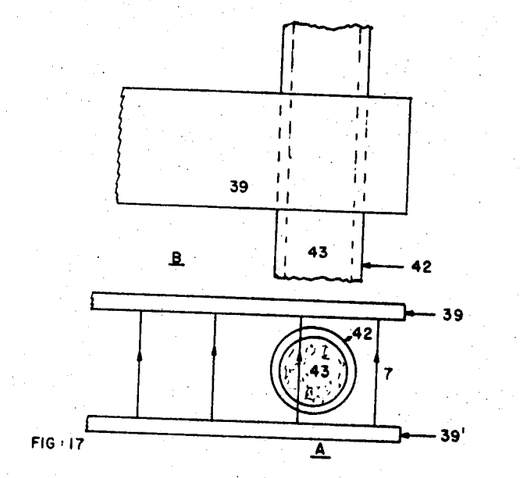
FIGS. 17A and 17B are, respectively, a front view and a top view of the parallel plates of the sensor in FIG. 10A, surrounding a plastic (or non-metallic) pipe, or tube, containing a liquid-solid dielectric mixture such as cheese, butter, etc.
Figure 18:
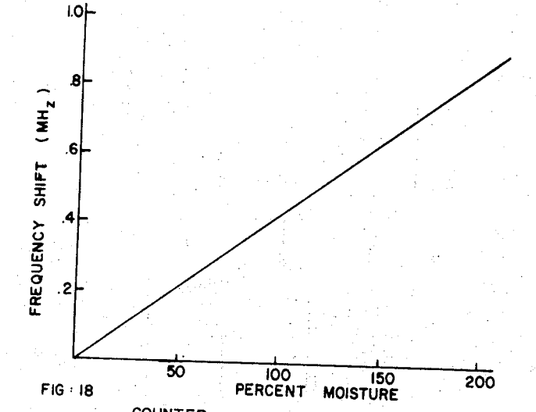
FIG. 18 is a diagrammatic view which shows the frequency shift as a function of the moisture content in cottage cheese.

FIG. 17 shows an arrangement whereby the parallel plates 39 and 39' surround a plastic pipe 42 in which a liquid mixture or a liquid-solid mixture is being pumped. The results of moisture measurements on cottage cheese are illustrated in FIG. 18.

Figure 19:
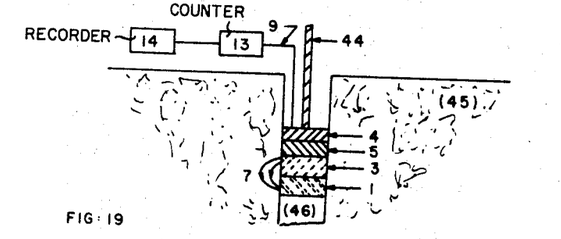
FIG. 19 is a schematic view which shows a fringing field oscillator with a circular sensor, such as shown in FIG. 2, which is lowered into a hole, drilled into the earth, for the purpose of measuring material properties of the soil adjacent to the walls of the hole.

FIG. 19 shows a preferred embodiment of the present invention used for measuring the soil 45 adjacent to the walls of a hole 46 drilled into the earth. In such a case the circular geometry of the far field sensor in FIG. 2, or the width of the sensor in FIG. 10A, is matched to the hole diameter. The fringing field sensors 1 are lowered, with a long shaft 44, along with the microwave amplifier 3, the coupler 4, the phase control unit 5, and other necessary items in accordance with the teachings of this invention. A suitable electrical cable 9, links the fringing field oscillator package to the frequency counter 13, and the recorder 14.

An arrangement for reducing the effects of variations in the ambient temperature can be made by placing two sensors back to back and feeding their respective output signals into a frequency mixer. It is well known by those skilled in the art that such an arrangement cancels out any changes in the frequency caused by temperature variations in the vicinity of the sensor used for measuring. The difference frequency at the output of the mixer will vary according to the variations brought about by changes in the material in the vicinity of the measuring sensor but it will not vary to temperature variations if both sensors are submitted to the same ambient temperature condition.

In some cases it may be desirable to lower the frequency of the output signal such that it can be measured by a low frequency counter (0–10 MHz) which are more common than higher frequency counters. In this case a local oscillator signal is fed into the frequency mixer such that the difference in frequency is within the measuring range of the counter to be used for measuring the frequency variations.

Thus, there has been illustrated and described a novel apparatus and method for determining the physical and chemical properties of a member to be tested, as well as a far fringing field microwave oscillator apparatus, which fulfill all of the objects and advantages sought therefore. Many changes, modifications, variations, and other uses and applications of this system will become apparent to those skilled in the art after considering the specification and the accompanying drawings. Therefore, all such changes, modifications, variations and other uses and applications which do not depart from the spirit and scope of the invention are deemed to be covered by the invention which is limited only by the following claims.

I claim:

1. An oscillator system for measuring a property of a material, said oscillator system comprising electromagnetic energy generating means, a sensing element operatively connected across said energy generating means and receiving electrical field producing energy from said energy generating means, means located in said sensing element to generate an electromagnetic energy field capable of being coupled across said material, said operative connection between said energy generating means and said sensing element being such that an oscillating frequency is generated by said energy generating means responsive to the coupling of the electromagnetic energy across said material and in response to such property of said material, and frequency measuring means operatively associated with said energy generating means and said sensing means to receive the oscillating frequency and thereby measure the value of said property in response to the oscillating frequency.

2. The oscillator system of claim 1 further characterized in that a power dividing means is operatively interposed in the operative connection between said energy generating means and said sensing means, and that the frequency measuring means is operatively connected to said power dividing means.

3. The oscillator system of claim 2 further characterized in that said sensor means receives an output from said energy generating means through said power dividing means and said sensor means generates a signal in response to the measured property which is introduced as an input to said energy generating means to thereby generate an oscillating frequency dependent on the measured property.

4. The oscillator system of claim 3 further characterized in that wave control means is operatively interposed between said divider means and said sensor means.

5. The oscillator system of claim 1 further characterized in that said energy generating means comprises a radio frequency energy generator which receives power from a source thereof.

6. The oscillator system of claim 1 further characterized in that said energy generating means comprises a radio frequency energy generator which receives power from a source thereof and that the means in said sensing element which generates an electromagnetic energy field is adapted to generate radio frequency energy.

7. The oscillator system of claim 2 further characterized in that said frequency measuring means is operatively electrically connected to said power dividing means.

8. The oscillator system of claim 2 further characterized in that a transmitting means is operatively connected to said power dividing means and operates in conjunction with power receiving means operatively connected to said frequency measuring means to receive the oscillating frequency.

9. The oscillator system of claim 1 further characterized in that digital recording means are operatively connected to said frequency measuring means.

10. The oscillator system of claim 1 further characterized in that digital processing means are operatively connected to said frequency measuring means and process control means are operatively connected to said digital processing means to adjust parameters with respect to the property of the material thus measured.

11. The oscillator system of claim 1 further characterized in that said system is a fringing field oscillator system and that the electromagnetic energy field generated at said sensing means is a radio frequency fringing field.

12. A far fringing field oscillator circuit comprising electromagnetic energy amplification means with means for operative connection to a source of electrical power, an electromagnetic field generating element operatively connected to one terminal of said amplification means, power dividing means operatively electrically interposed between said electromagnetic field generating element and said last named terminal of said amplification means so that said field generating means receives electrical field producing energy from said amplification means, means located in said field generating element to generate an electromagnetic energy field capable of being coupled through an external medium, said field generating means also being operatively electrically connected to the other terminal of said amplification means in such manner that an oscillating frequency is generated by said amplification means responsive to the coupling through said external medium, and frequency responsive means operatively associated with said power dividing means to receive the oscillating frequency thus developed at said amplification means and providing an output in response to said oscillating frequency.

13. The far fringing field oscillator of claim 12 further characterized in that wave control means are operatively interposed between said dividing means and said field generating means.

14. The far fringing field oscillator of claim 12 further characterized in that said energy amplification means comprises a radio frequency energy amplifier which receives D.C. power from a source thereof.

15. The far fringing field oscillator of claim 12 further characterized in that said energy amplification means comprises a radio frequency energy amplifier which receives D.C. power from a source thereof and that the means in said field generating means which generates an electromagnetic energy field is adapted to generate radio frequency energy.

16. The far fringing field oscillator of claim 12 further characterized in that said frequency ressponsive means is operatively electrically connected to said power dividing means.

17. The far fringing field oscillator of claim 12 further characterized in that a transmitting means is operatively connected to said power dividing means and operates in conjunction with a receiving means operatively connected to said frequency responsive means to receive the oscillating frequency.

18. A method for measuring a property of a material, said method comprising placing a sensor in relation to the material in which the property is to be measured, applying a source of electrical energy to said sensor, generating an electromagnetic energy fringing field at said sensor thereby coupling the material through the field with said sensor, generating an oscillating frequency responsive to the coupling of the electromagnetic energy across the material used in response to the property of said material, and measuring the frequency of oscillation of said oscillating frequency to thereby measure the value of said property which is dependent on said frequency of oscillation.

19. The method for measuring the property of the material of claim 18 further characterized in that the method comprises generating a radio frequency energy.

20. The method for measuring the property of the material of claim 18 further characterized in that the oscillating frequency is transmitted to a device for measuring the frequency of oscillation by an electrical conductor.

21. The method for measuring the property of the material of claim 18 further characterized in that the oscillating frequency is transmitted to a device for measuring the frequency of oscillation by transmitting and receiving antennas.

22. The method for measuring the property of the material of claim 18 further characterized in that the measured oscillated frequency is displayed on a visual display device.

23. A far fringing field sensor apparatus comprising at least one first pair of spaced-apart conductors, a second pair of spaced-apart conductors angularly located with respect to said first pair of spaced-apart conductors for defining an area to accumulate electromagnetic waves, said single second pair of spaced-apart conductors at least partially determining the frequency at which the electromagnetic waves are accumulated in the area defined by said first pair of spaced-apart conductors, said second pair of spaced-apart conductors also being electrically connected to said first pair of spaced-apart conductors and said first and second pairs of conductors being mounted relative to each other in a relationship so that the distance between the conductors of said second pair is relatively small compared to the overall length of the conductors in said first pair, to establish a desired wavelength of the electromagnetic waves, the area defined by said first and second pairs of spaced-apart conductors forming a sensing field therebetween and wave creating means for said first and second pairs of conductors for exciting said first and second pairs of conductors at an operating frequency level.

24. An apparatus as defined in claim 23, said apparatus including at least one further pair of spaced-apart conductor means adapted for accumulating electromagnetic waves, said further pair of spaced-apart conductor means being in general alignment with and spaced from the respective ones of said first pair of conductor means, said further pair of conductor means being electrically connected to said second pair of spaced-apart conductor means, and said first pair of spaced-apart conductor means together with said further pair of spaced-apart conductor means and with said second pair of conductor means forming a sensing field between said second pair of conductor means.

25. An apparatus as defined in claim 24 wherein there is included shorting means for electrically connecting together at least both of said first pair of conductor means and both of said further pair of conductor means.

26. An apparatus as defined in claim 23 wherein there is included first and second electrical terminal means electrically connected to a source of electrical power, said first electrical terminal means being electrically connected to one of said first pair of spaced-apart conductor means, the second of said electrical terminal means being spaced from the other of said first pair of spaced-apart conductor means to form a capacitive gap therebetween.

27. A far fringing field sensor electromagnetic energy apparatus comprising at least one first pair of spaced-apart conductor means, electromagnetic waves, a single second pair of spaced-apart conductor means at least partially determining the frequency at which the electromagnetic waves are accumulated in the area defined by said first pair of spaced-apart conductor means, said second pair of spaced-apart conductor means being electrically connected to said first pair of spaced-apart conductor means and said first and second pairs of conductor means being mounted relative to each other in a relationship to establish a frequency for said electromagnetic waves of between about 50 megahertz and 10,000 megahertz, said first and second pairs of spaced-apart conductor means forming a sensing field between said second pair of conductors, and wave creating means for said first and second pairs of conductor means for exciting said first and second pairs of conductor means at an operating frequency level.

28. The far fringing field apparatus of claim 27 wherein the first and second pairs of conductor means are mounted to establish a frequency of 100 to 450 megahertz.

* * * * *